(12) United States Patent
Hu

(10) Patent No.: US 9,397,984 B1
(45) Date of Patent: Jul. 19, 2016

(54) APPARATUS AND METHOD FOR SECURE FILE TRANSFER

(71) Applicant: Xuesong Hu, Eugene, OR (US)

(72) Inventor: Xuesong Hu, Eugene, OR (US)

( * ) Notice: Subject to any disclaimer, the term of this patent is extended or adjusted under 35 U.S.C. 154(b) by 0 days.

(21) Appl. No.: 14/750,567

(22) Filed: Jun. 25, 2015

(51) Int. Cl.
*G06F 7/04* (2006.01)
*H04L 29/06* (2006.01)

(52) U.S. Cl.
CPC .......... *H04L 63/0428* (2013.01); *H04L 63/061* (2013.01)

(58) Field of Classification Search
CPC ....................................... G06F 21/10
USPC ..................................... 726/26, 27
See application file for complete search history.

(56) References Cited

U.S. PATENT DOCUMENTS

| | | | |
|---|---|---|---|
| 6,389,403 B1 * | 5/2002 | Dorak, Jr. ............... | G06F 21/10 705/51 |
| 7,181,017 B1 | 2/2007 | Nagel et al. | |
| 8,108,918 B2 | 1/2012 | Rowley | |
| 8,375,223 B2 | 2/2013 | DeHaan et al. | |
| 8,601,598 B2 | 12/2013 | Ozzie et al. | |
| 8,745,416 B2 | 6/2014 | Bogorad | |
| 2006/0277416 A1 * | 12/2006 | Counts .................. | G06F 21/606 713/193 |
| 2012/0204030 A1 | 8/2012 | Nossik et al. | |
| 2013/0145447 A1 | 6/2013 | Maron | |
| 2014/0075180 A1 * | 3/2014 | Farrugia ................. | G06F 21/10 713/150 |
| 2014/0173272 A1 | 6/2014 | Kim | |
| 2014/0189352 A1 | 7/2014 | Baskaran | |
| 2014/0195798 A1 | 7/2014 | Brugger et al. | |
| 2014/0281520 A1 | 9/2014 | Selgas et al. | |
| 2015/0293817 A1 * | 10/2015 | Subramanian .... | G06F 17/30212 707/645 |

FOREIGN PATENT DOCUMENTS

WO 2014/132246 A1 9/2014

* cited by examiner

*Primary Examiner* — Christopher Brown
(74) *Attorney, Agent, or Firm* — Maier & Maier, PLLC

(57) ABSTRACT

An apparatus and method for secure file transfer may be provided. In an exemplary embodiment, a file may include a content record and a metadata record. The content record and metadata record may each be encrypted. The encrypted content record and encrypted metadata record may each be uploaded to at least one server. The metadata record may be decrypted and the content record may subsequently be called from the at least one server and decrypted, resulting in a recreation of the original file. The server may have zero knowledge of the file records.

17 Claims, 19 Drawing Sheets

APPARATUS AND METHOD FOR SECURE FILE TRANSFER

BACKGROUND

Through the advent of computers and the internet, electronic file sharing has become a prevalent, convenient form of communicating, collaborating, and transferring data. Electronic file sharing has many advantages, including convenience, speed of delivery, and collaborative features enabled by word processors. However, electronically transferred files may be vulnerable to third parties. The files or contents of the files may be accessed by such third parties. The parties sharing the files may wish for the content to remain private, though. Many existing file sharing platforms may encrypt files during transfer so that third parties cannot access the content. However, it is often the case that the file sharing server may have access to the encrypted data. The vulnerability of electronically transferred files has existed since the use computer networks began and solutions for protecting transferred files within the computer framework have long been desired.

SUMMARY

According to an exemplary embodiment, a method of secure file transfer may be provided. The method may include first determining a desired recipient. A metadata record may be encrypted using a public key associated with the desired recipient. A content record may also be encrypted using the public key. The encrypted metadata record may be uploaded to a first server. The encrypted content record may be uploaded to the first server or a second server. The encrypted metadata record may be downloaded to a recipient device. The metadata record may be decrypted using the recipient private key. The encrypted content record may then be downloaded and decrypted using the private key.

According to another exemplary embodiment, a non-transitory computer readable medium for zero-knowledge file transfer may be provided. The non-transitory computer readable medium may include instructions that when executed on a processor perform a series of steps. The steps may include encrypting a metadata record for a file using a public key associated with a recipient, encrypting a content record for the file using the public key associated with the recipient, uploading the encrypted metadata record for the file to a first server from a transfer device, uploading the encrypted content record for the file to at least one of the first server or a second server from a transfer device, downloading the encrypted metadata record for a file on a recipient device, decrypting the encrypted metadata record for the file using a private key associated with the recipient, retrieving the encrypted content record for the file from the first server using the decrypted metadata record, and decrypting the encrypted content record for the file using the private key associated with the recipient.

According to yet another exemplary embodiment, a non-transitory computer readable medium for zero-knowledge mail transfer may be provided. The non-transitory computer readable medium may include instructions that when executed on a processor perform a series of steps. The steps may include encrypting a content record of a mail file using a file-key, resulting in a ciphertext record. Next, the file-key may be encrypted using a recipient public key, resulting in an encrypted file-key. The encrypted file-key and ciphertext record may be uploaded to a server. A metadata record of the mail file may be encrypted using a DB-key, resulting in a ciphertext metadata record, which may be uploaded to a server. The DB-key may be encrypted with a recipient public key, resulting in an encrypted DB-key, which may then be uploaded to the server. A mail message record may be encrypted using a recipient public key and may be stored on a mail server. The mail message may be received from the mail server and decrypted using a recipient private key. Next, the encrypted metadata record and encrypted DB-key may be retrieved, the DB-key may be decrypted using the private key, and the metadata record may be recreated using the DB-key. Finally, the encrypted mail content record and encrypted file-key may be retrieved. The file-key may be decrypted using the private key, and the mail content record may be recreated using the file-key.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Figure 1:
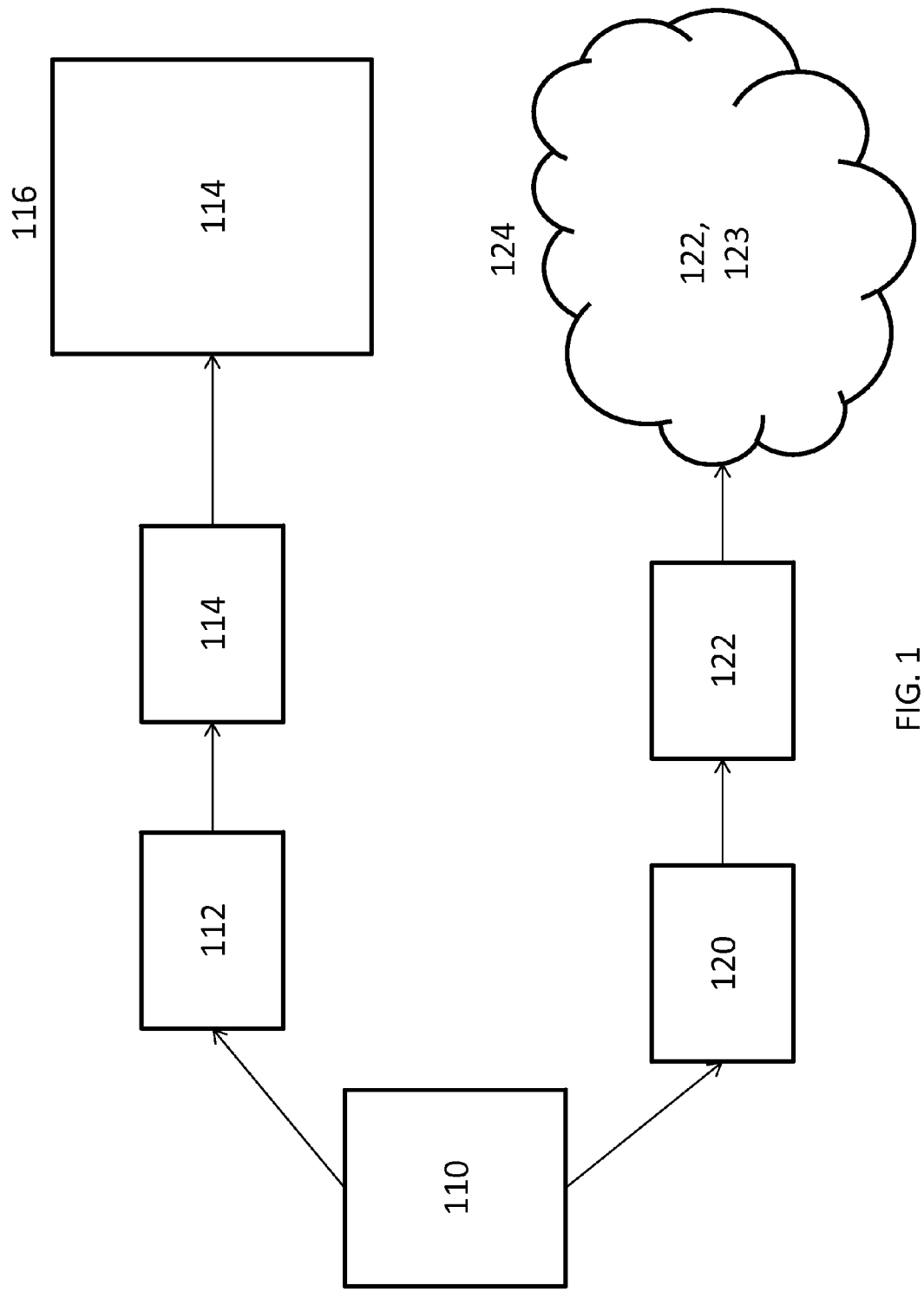
FIG. 1 is a wireframe showing an exemplary zero-knowledge file storage.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

In an exemplary embodiment, a file transferred across a network, such as the internet, may be stored on at least one server. A server may include a physical server or a cloud based server. The at least one server may store at least two types of information pertaining to the file, the content of the file and metadata about the file. Metadata may include the file name, the file type, the file size, the creation time of the file, and the modification time of the file. Both sets of information may need to be stored in order to relay a file across a network to its destination. To maintain file security, both sets of information should be hidden from the server and all third parties. This may be referred to as a zero-knowledge state for the server.

To achieve a zero-knowledge state, the content of the file and the metadata may be isolated in a computer memory sector prior to being uploaded to a server. The content record may first be encrypted prior to being sent to a server. False metadata may be assigned to the encrypted file prior to being stored on a server. This may include a false name, file type, file size, creation time, and modification time. The file size may be falsified by "padding." A separate record may be created to save the file's metadata prior to being sent to a server. This separate record may be encrypted and only the encrypted version, or cipher text, of the record may be sent to a server. In other words, both sets of information may be physically isolated, encrypted, and subsequently communicated over a network separately. In some exemplary embodiments, an encrypted content record may be stored on a separate server from an encrypted metadata record. For example, a metadata record may be stored on an application server and a content record may be stored on a separate cloud-based server. The separate servers may further be controlled by separate parties. In other exemplary embodiments, the records may be stored on the same server or on servers controlled by the same party. Regardless of whether the content record and metadata record are stored on servers controlled by the same party, the controlling party may not have knowledge of the files in a decrypted form.

A client-side private key may be used to decipher the file content and the metadata records. The private key may never be transferred to or stored on a server in any form, including plaintext or encrypted form. Consequently, both the encryption and decryption operations may be conducted on the client-side. Only the encrypted data may interact with a server, maintaining a zero-knowledge state for the at least one server.

In an exemplary embodiment, encryptions may be performed using Advanced Encryption Standard (AES) and may use a unique key for each file. This may guarantee forward secrecy. Additionally, AES keys may be wrapped using a per user RSA public key, as would be understood by a person having ordinary skill in the art. The RSA private key may be necessary to decrypt the file, however, the RSA private key may never be transferred to or stored on the server in plain text form or encrypted form. In other words, the user's private key may have never left the client machine and may be solely managed by the user.

In some exemplary embodiments, the zero-knowledge file transfer may be performed by a software application. For embodiments transferring files to separate devices, the software application may be implemented on each device. The software application may utilize a public key infrastructure (PKI), such that the application creates a paired public key and private key for a user when the user signs up. The public key may be shared among users, but the private key may be kept by the assigned user. The public key may be uploaded to an application server for future distribution among users. Since a user's public key is available for others, it can be used to encrypt a file or message. The file or message encrypted with a user's public key may then only be decrypted by the user's private key. Therefore, a file or message intended for a User 1 may be encrypted with User 1's public key and only User 1, who possesses the private key, can read the message. PKI may use an asymmetric encryption scheme where encryption and decryption use different keys, a pair of public and private keys. It may only be necessary to keep the private key private. Therefore, a first user may search for a second user through the file transfer application and the server may provide a public key for the searched user. This may facilitate distribution of public keys among users. With the automatic exchange of public keys, files may be automatically encrypted for a specific user through the application. The file may be automatically decrypted on the recipient device using the assigned private key.

Broken down to basic conceptual form, and as provided in FIG. 1, zero knowledge storage may be accomplished for a file 110. A metadata record 112 for a file 110 may be encrypted to form an encrypted metadata record 114, which may be stored on a server 116. A content record 120 for a file 110 may be encrypted to form an encrypted content record 122, which may be stored on a server 124. A metadata record 112 may include a hashed file name 123, which may be used to locate and retrieve an encrypted content record 122. Server 116 and server 124 may optionally be separate servers. For example, one may be an app server and the other may be cloud-based storage. In alternative embodiments, servers 116, 124 may be the same or may be controlled by the same party. Regardless, the servers may have zero knowledge of the file data 110.

The server zero-knowledge file transfer may be used for a variety of scenarios including, but not limited to, folder syncing among devices, file sharing between separate parties, and group file sharing and collaboration.

Figure 2:
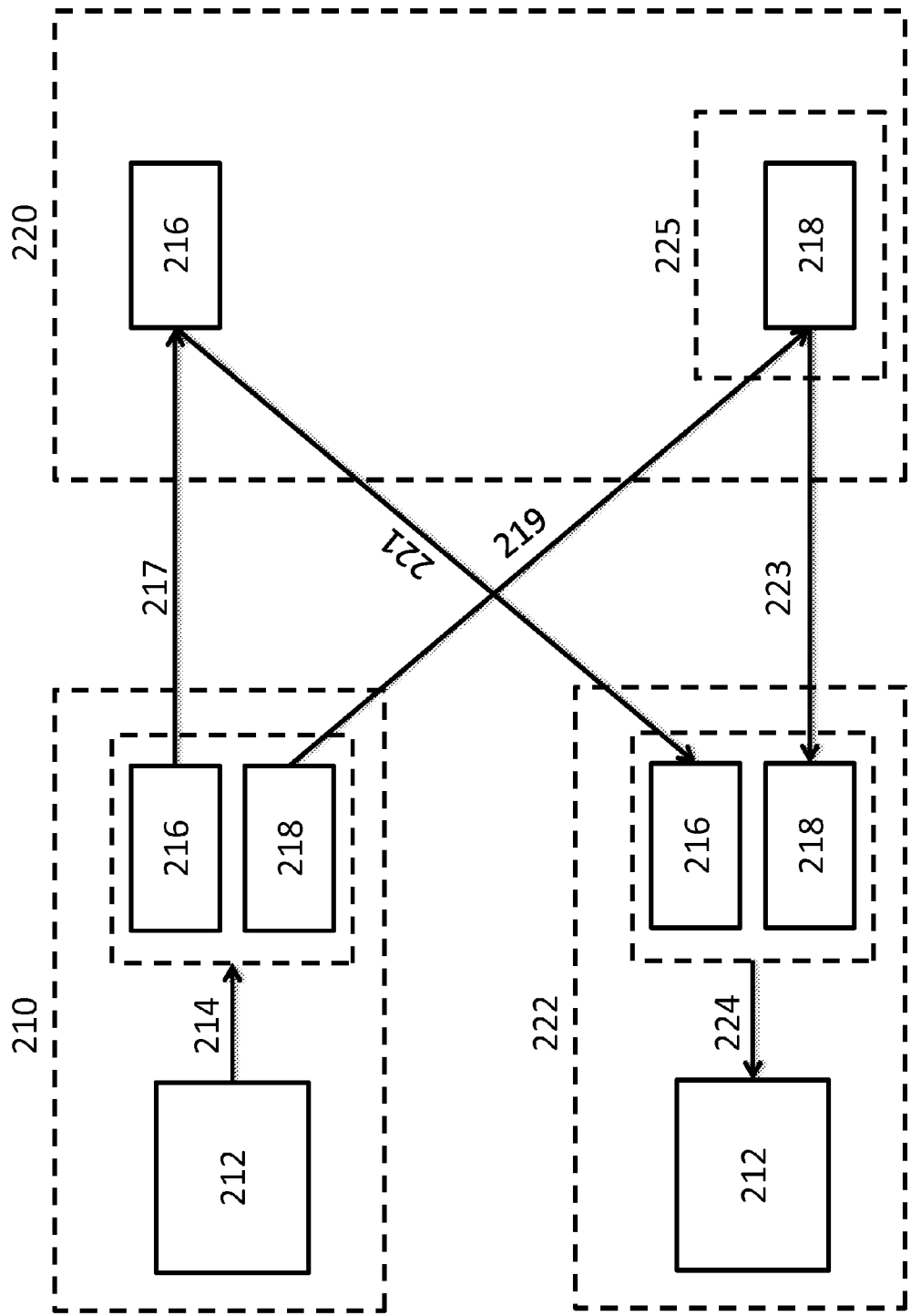
FIG. 2 is a wireframe showing an exemplary zero-knowledge sync folder.

Now referring to exemplary FIG. 2, a sync folder embodiment may be shown. A sync folder embodiment may include a file content encryption/decryption module, a metadata database management and encryption/decryption module, and a user-based distributed version control system (DVCS) tool. The DVCS tool may maintain faithful representation between a client and a server on the encrypted metadata database. A first device 210 for User A may include a file 212. The file may be encrypted with public key encryption 214 such that there is an encrypted metadata record 216 and an encrypted content record 218. Encrypted records 216, 218 may be uploaded 217, 219 over a network and stored separately on at least one server 220, 225. User A may subsequently access records 216, 218 on the at least one server 220, 225 with a second device 222. The encrypted records 216, 218 may be downloaded 221, 223 over a network to the second device 222, at which point, the records 216, 218 may be decrypted using private key decryption 224. The original file 212 may then be recreated on the second device 222.

Figure 3:
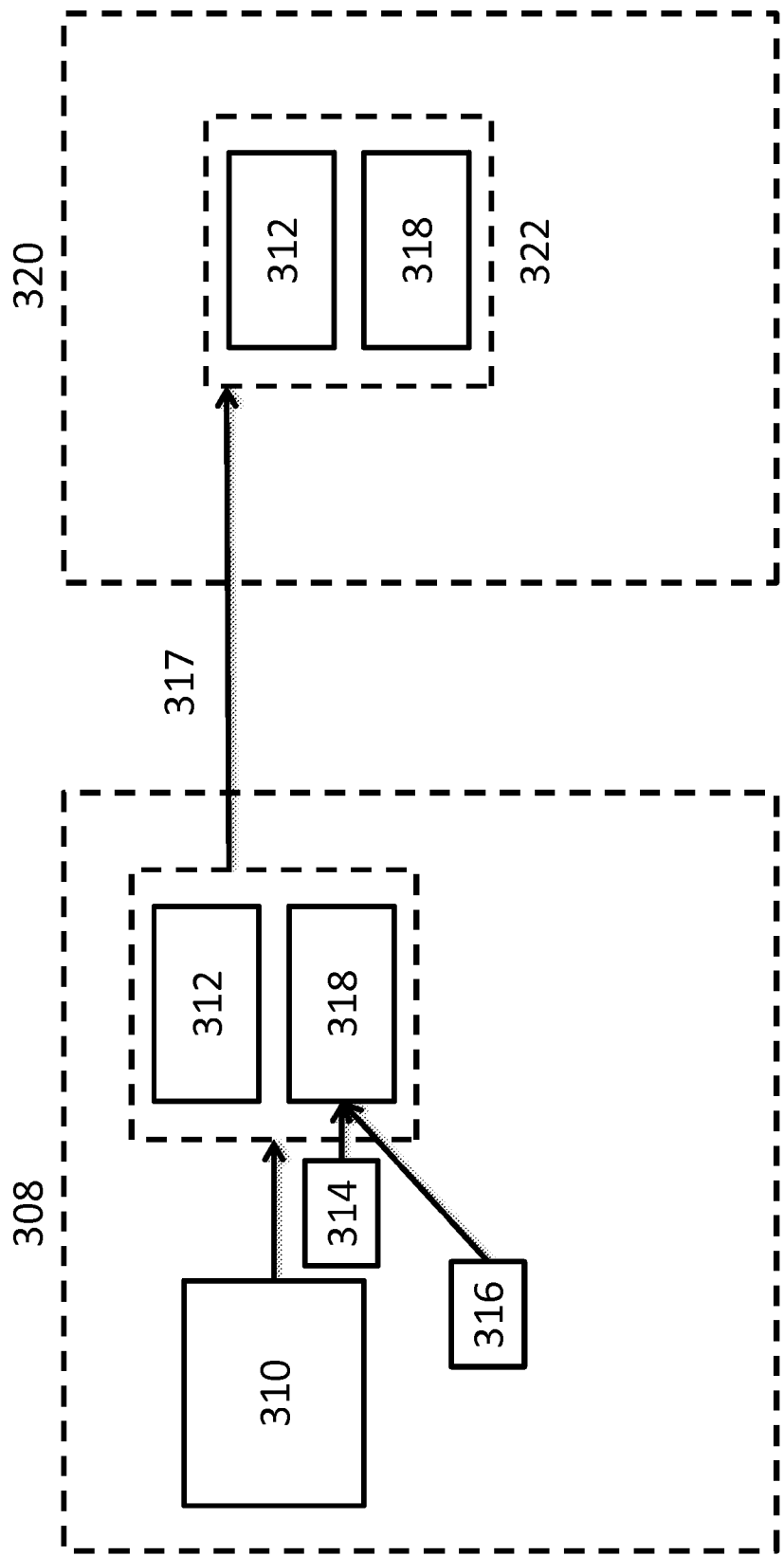
FIG. 3 is a wireframe showing an exemplary sync folder file upload.

FIG. 3 may show a more detailed view of the upload of the file content record 310 from a user/client device 308 to a server 320. The content record 310 may be encrypted resulting in a ciphertext record 312. A file-key 314, or symmetric encryption key, may be used to secure and the ciphertext record 312. A user may have a unique asymmetric public-private key pair. The user public key 316 may be used to encrypt the file-key 314 associated with the encrypted content record 312. The resulting encrypted content 312 and encrypted file key 318 may be uploaded 317 to a server or cloud storage 320. The record may have a hashed file name 322 for calling the record.

Figure 4:
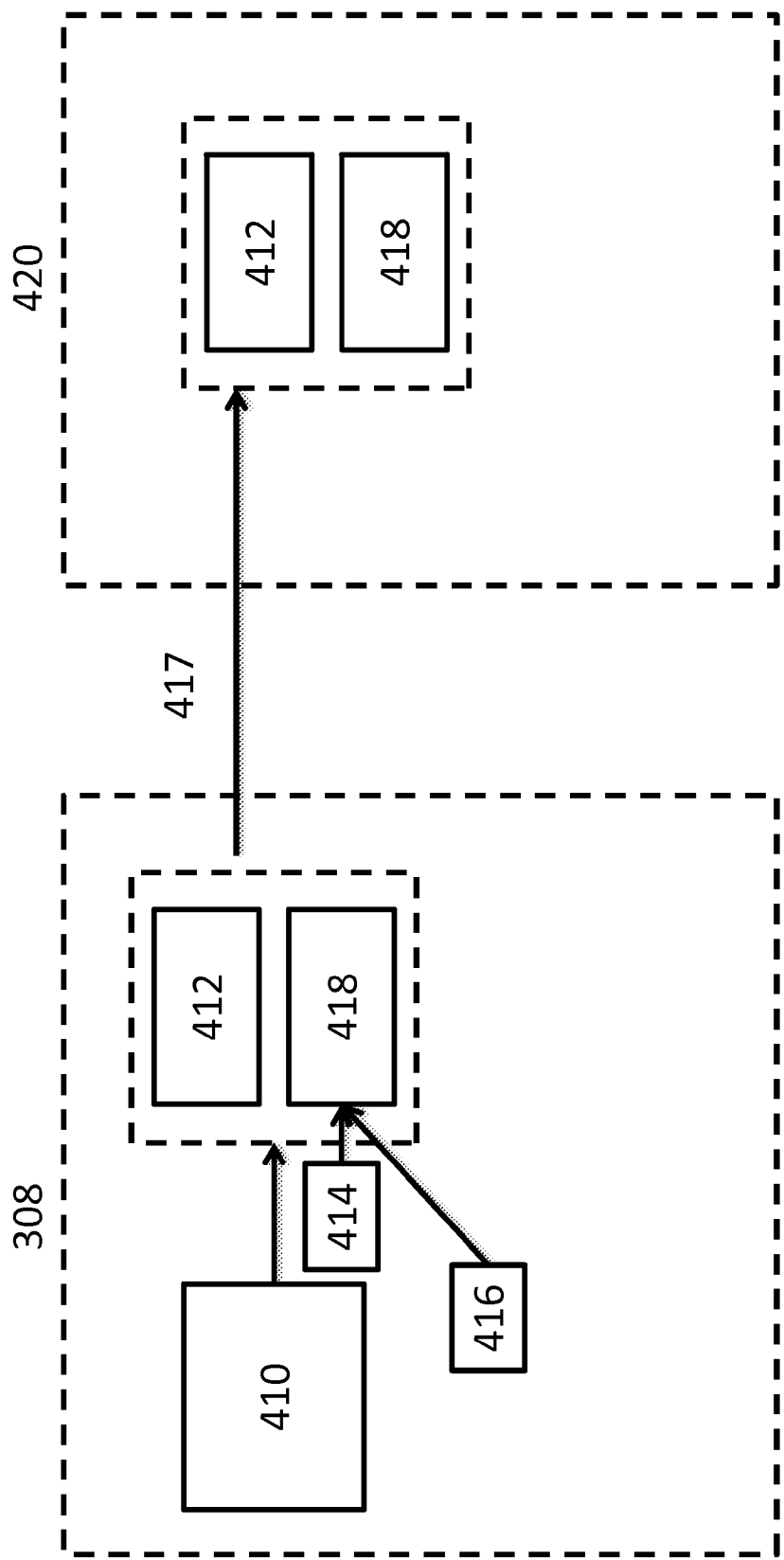
FIG. 4 is a wireframe showing an exemplary sync folder metadata upload.

Exemplary FIG. 4 may show a more detailed view of the upload of the metadata record 410 from a user/client device 308 to a server 420, such as an application server. The metadata database record 410 may be encrypted resulting in a ciphertext metadata record 412. A DB-key 414, or symmetric encryption key, may be used to secure and identify the ciphertext metadata record 412. A user public key 416 may be used to encrypt the DB-key 414 associated with the encrypted metadata DB record 412. The resulting encrypted metadata DB record 412 and encrypted DB-key 418 may be pushed to an app server 420 via a user-based DVCS 417. The metadata DB may be created and updated locally and subsequently encrypted prior to being pushed to a server 420 using a DVCS 417, as would be understood by a person having ordinary skill in the art.

Figure 5:
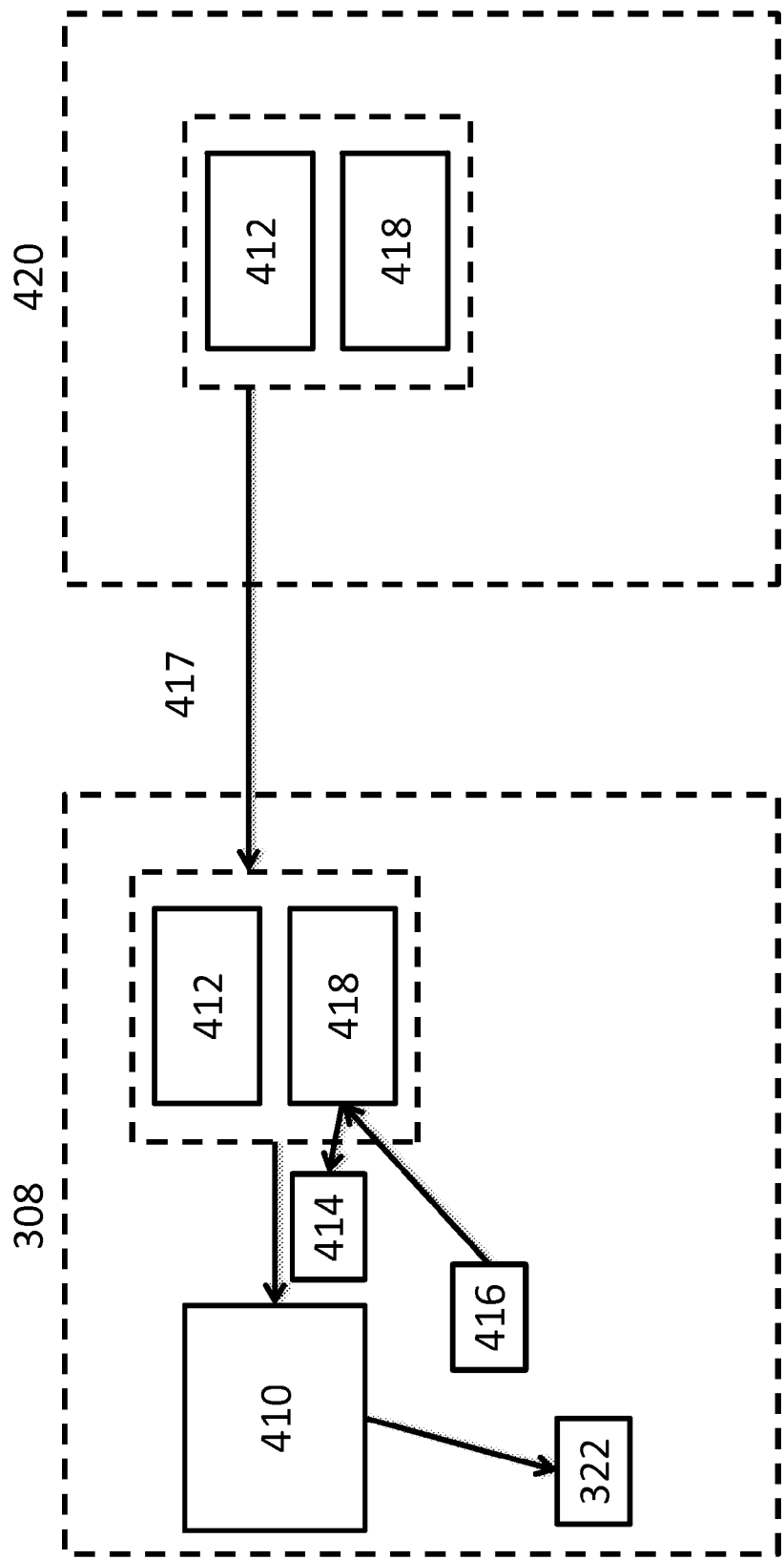
FIG. 5 is a wireframe showing an exemplary sync folder metadata download.

Exemplary FIG. 5 may show a more detailed view of the download of a metadata record 410. The encrypted metadata DB 412 may be pulled from a server 420 using a DVCS 417, as would be understood by a person having ordinary skill in the art. A user's private key 416 may be used to decrypt the encrypted DB-key 418 and subsequently with the decrypted DB-key 414 may decrypt the metadata cipher text 412, resulting in a recreated metadata DB record 410. The hashed file name 322 of the encrypted content record 312 may be determined from the decrypted data 410.

Figure 6:
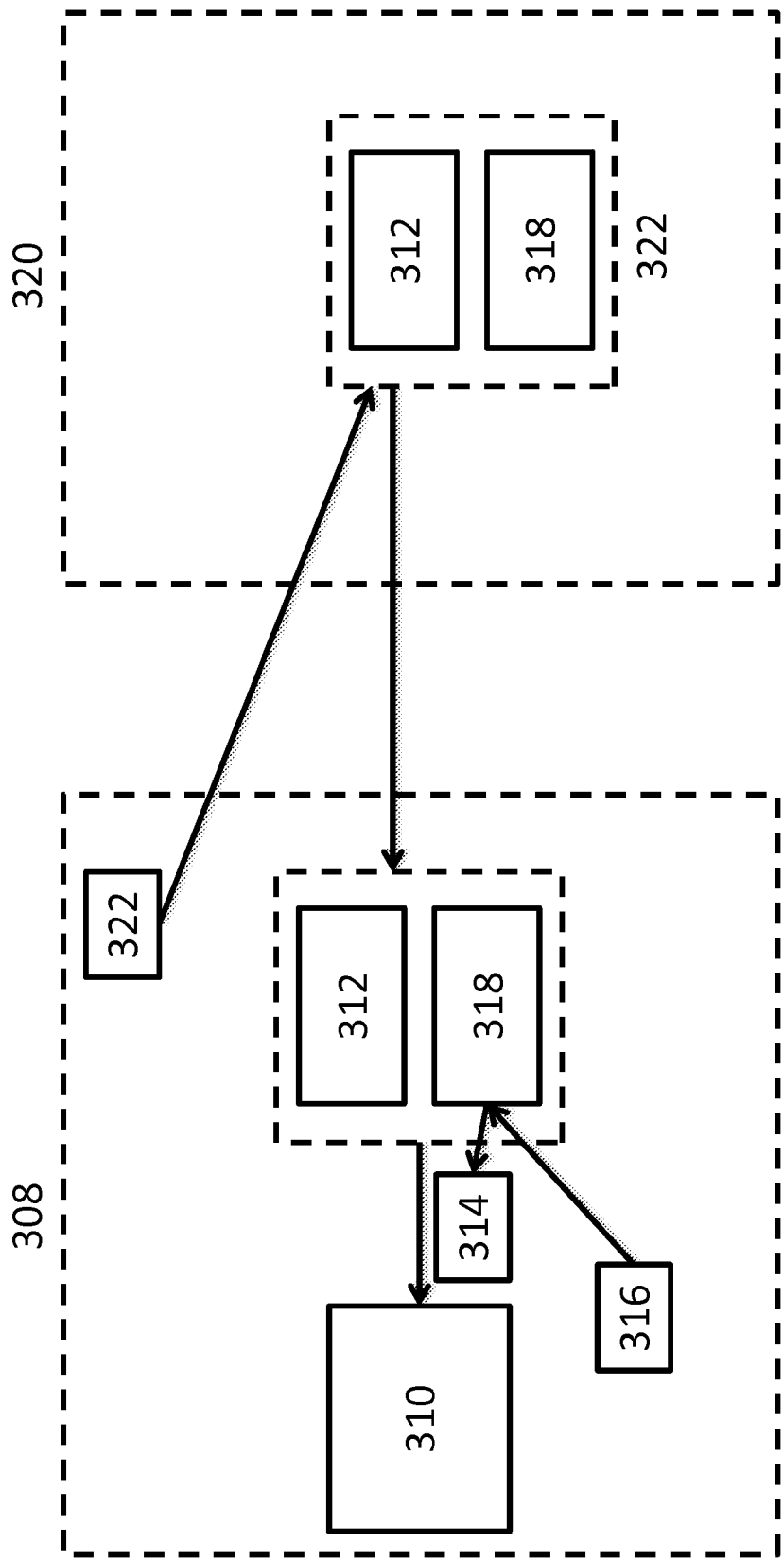
FIG. 6 is a wireframe showing an exemplary sync folder file download.

Exemplary FIG. 6 may show a more detailed view of the download of a content record 310. An identifying record 322, or hashed file name, may be extracted from the metadata DB 410 (shown in FIG. 5) and may be used to retrieve encrypted file content 312, which may then be reconstructed to its original state 310. The identifying record 322 may be used to retrieve the encrypted file content record 312 from the server 320, or cloud storage, along with the encrypted file-key 318. A user's private key 316 may be used to decrypt the encrypted file-key 318 resulting in the decrypted file-key 314. Subsequently, the encrypted file content 312 may be decrypted and reconstructed into the original file content 310.

Figure 7:
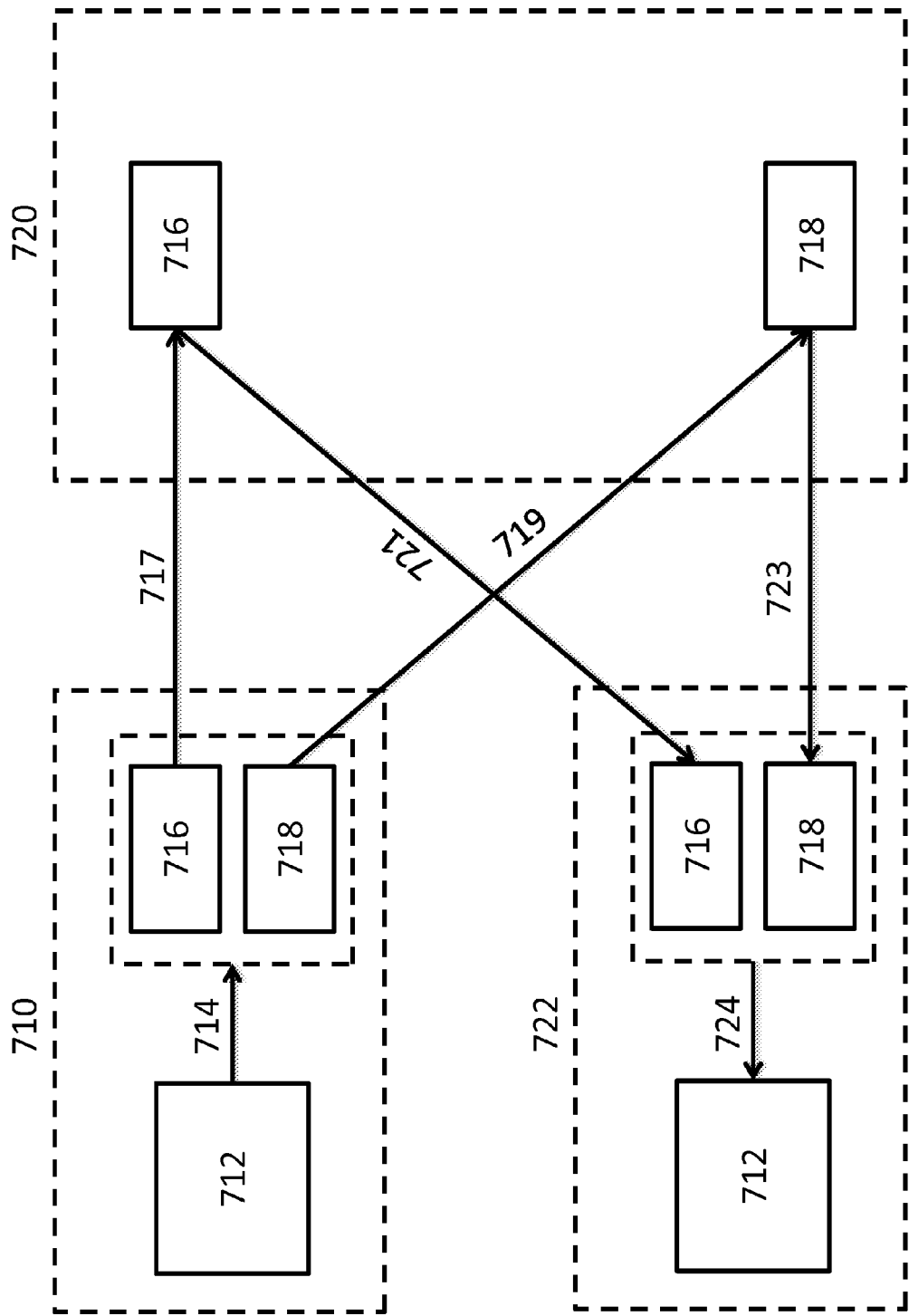
FIG. 7 is a wireframe showing an overview of an exemplary zero-knowledge file share.

Now referring to exemplary FIG. 7, a sharing folder embodiment between two users may be provided. A User A device 710 may include a file 712, which user A desires to share with user B. File 712 may be encrypted with a public key for user B 714 on device 710. This may result in an encrypted metadata record 716 and encrypted content record 718. The encrypted records 716, 718 may be uploaded 717, 719 and stored on at least one server 720. A second user on user B device 722 may subsequently access records 716, 718 on server 720. The encrypted records 716, 718 may be downloaded 721, 723 to user B device 722. Records 716, 718 may then be decrypted using a private key for user B 724. The original file 712 may then be recreated on user B device 722.

According to FIG. 8-11, a group folder sharing encryption scheme may be provided. A Distributed Version Control System (DVCS) may be utilized by a software application performing a group folder sharing encryption scheme. In general terms, a DVCS may package files and push the packaged files to a server. The DVCS on a different machine may pull the package from the server, unpack, and restore the group of files. For sharing, a first user, User A, may wish to share a file with a second user, User B. User A may first encrypt a file to be shared with User B using a unique symmetric key and may upload the encrypted file to a server, such as a cloud storage server. User A may then use User B's public key to encrypt the symmetric key and also upload the symmetric key.

Figure 8:
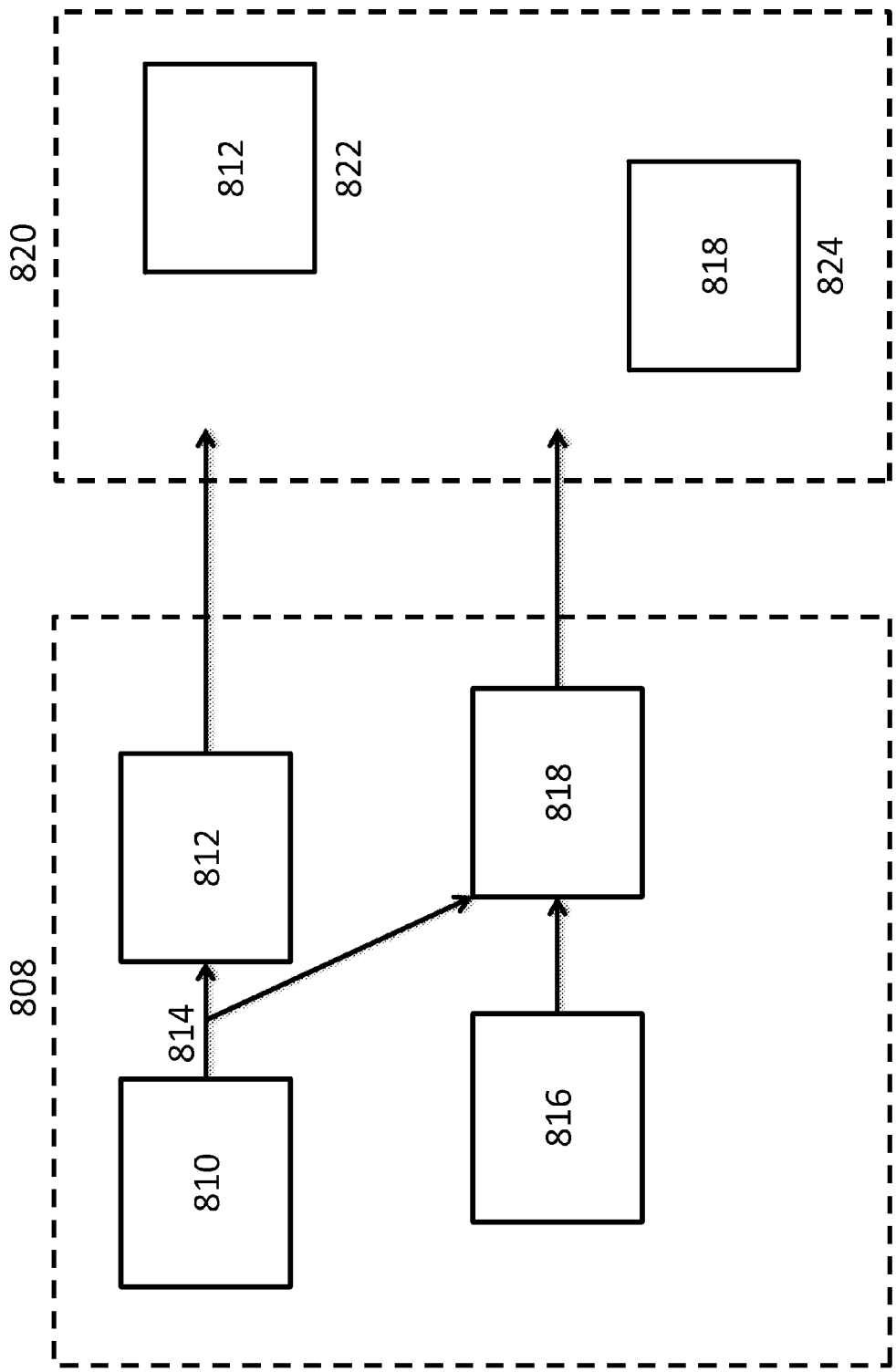
FIG. 8 is a wireframe showing an exemplary file share file upload.

Now referring to exemplary FIG. 8, an upload process for sharing a file content record 810 may be provided. A first user may wish to share a file 810 on a first user device 808. The file may be encrypted with a file-key 814. The encrypted file, or cipher text 812, may be uploaded to a server 820, such as cloud based storage. The file-key 814 may be encrypted with a second user public key 816 of a second user and the encrypted file-key 818 may then also be uploaded to a server 820. The encrypted file 812 may include a hashed file name 822 and the encrypted file-key 818 may include a hashed file key name 824.

Figure 9:
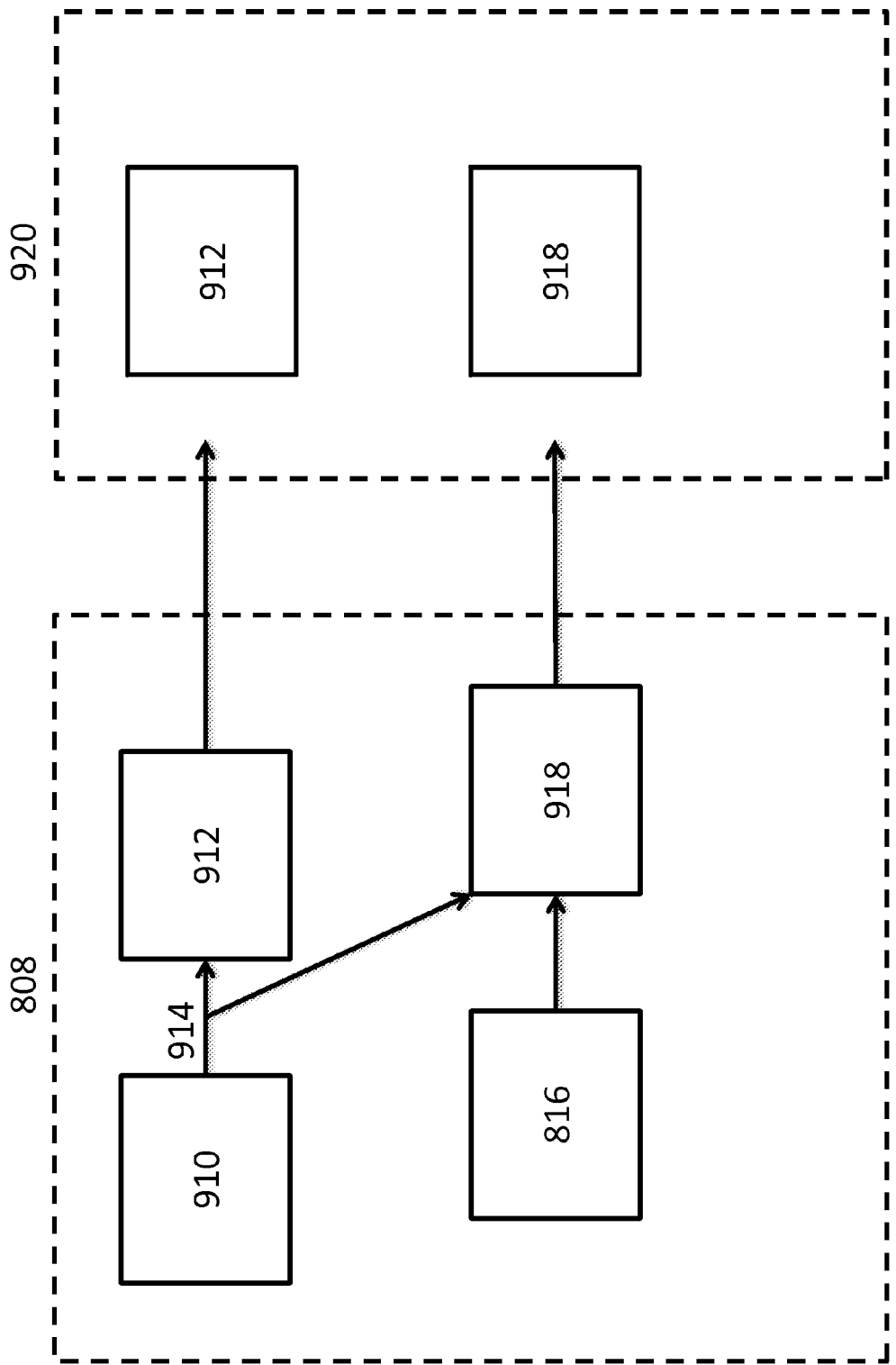
FIG. 9 is a wireframe showing an exemplary file share metadata upload.

Now referring to FIG. 9, an upload process for sharing a metadata DB record 910 may be provided. The metadata DB record 910 may include a hashed file name 822 and a hashed file key name 824. The metadata DB record 910 may be encrypted with a DB-key 914 resulting in a metadata DB cipher text record 912. Encrypted metadata DB record 912 may then be uploaded to an app server 920 by a group-based DVCS. The DB-key 914 may also be encrypted using a second user public key 816 of a second user and the encrypted DB-key 918 may then be uploaded to an app server 920 by a group-based DVCS.

Figure 10:
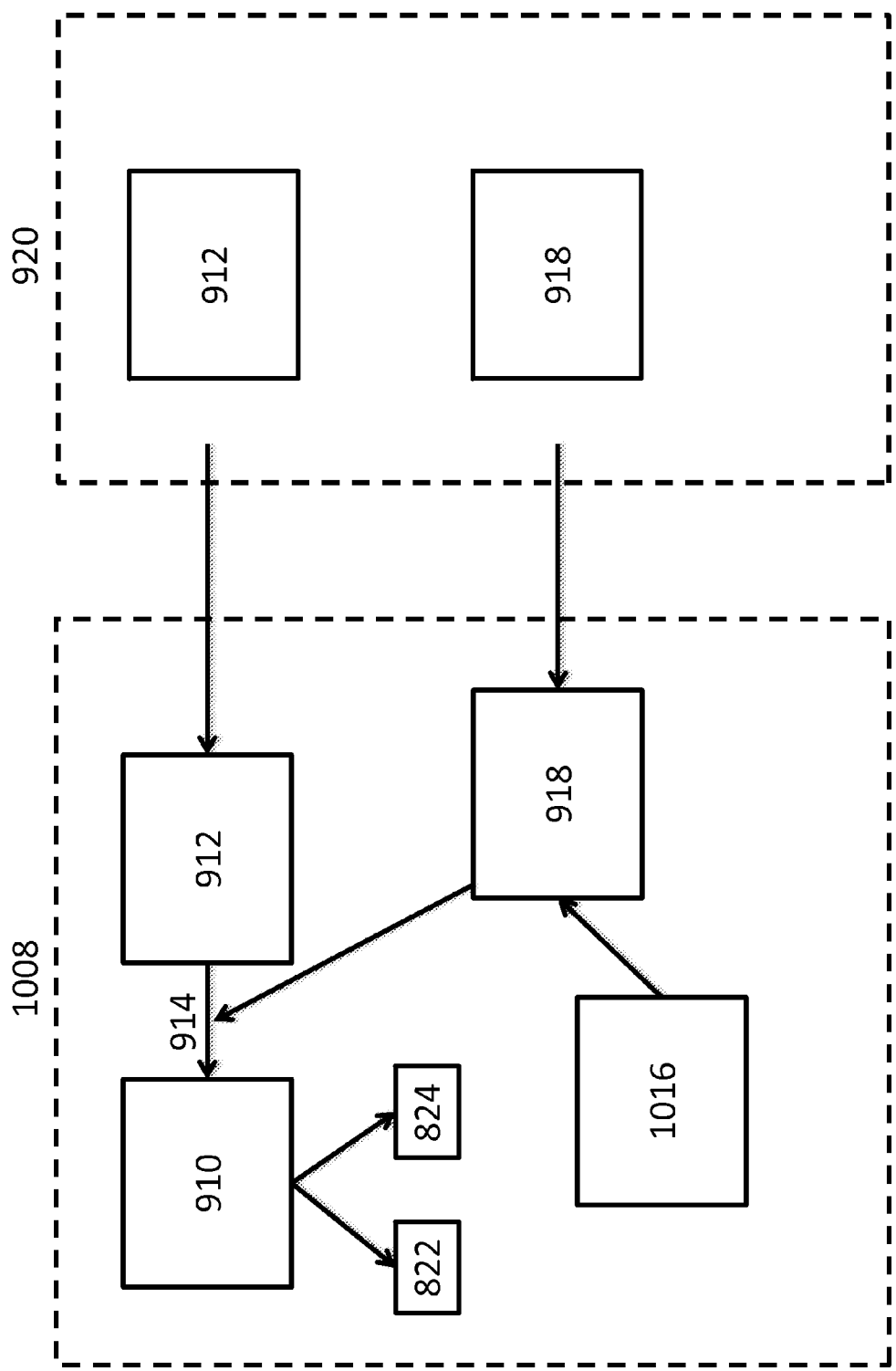
FIG. 10 is a wireframe showing an exemplary file share metadata download.

Now referring to exemplary FIG. 10, a detailed view of the sharing group folder download of a metadata DB record 910 may be provided. An encrypted metadata DB record 912 and encrypted DB-key 918 may be pulled from an app server 920 by group-based DVCS to a second user device 1008. A second user private key 1016 may be used to decrypt an encrypted DB-key 918, resulting in a decrypted DB-key 914. The encrypted metadata DB record 912 may then be decrypted resulting in a decrypted metadata DB record 910. A hashed file name 822 and hashed file key name 824 for an encrypted content record 812 and file key 818 may be determined from the decrypted metadata record 910.

Figure 11:
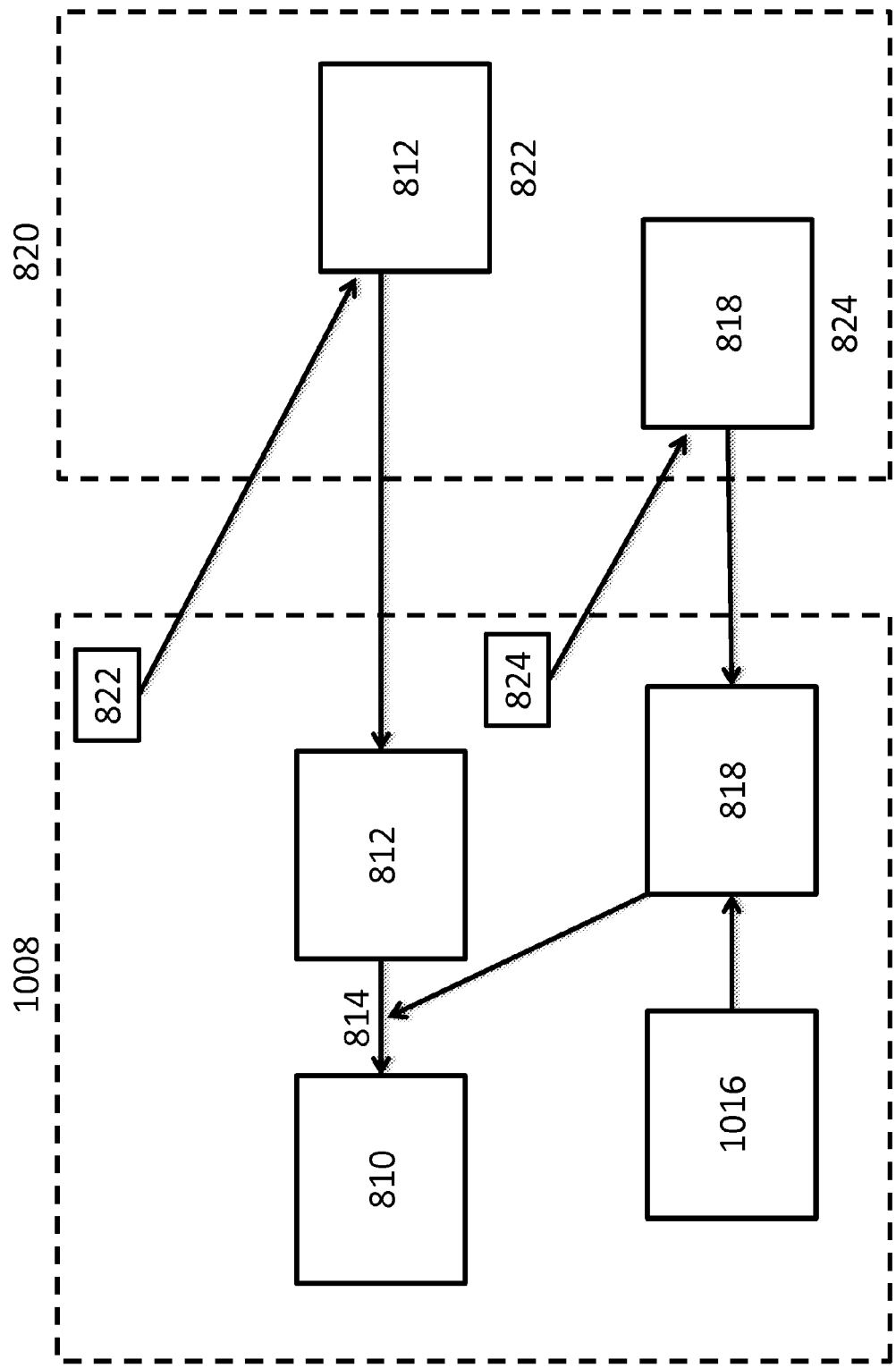
FIG. 11 is a wireframe showing an exemplary file share file download.
Figure 12:
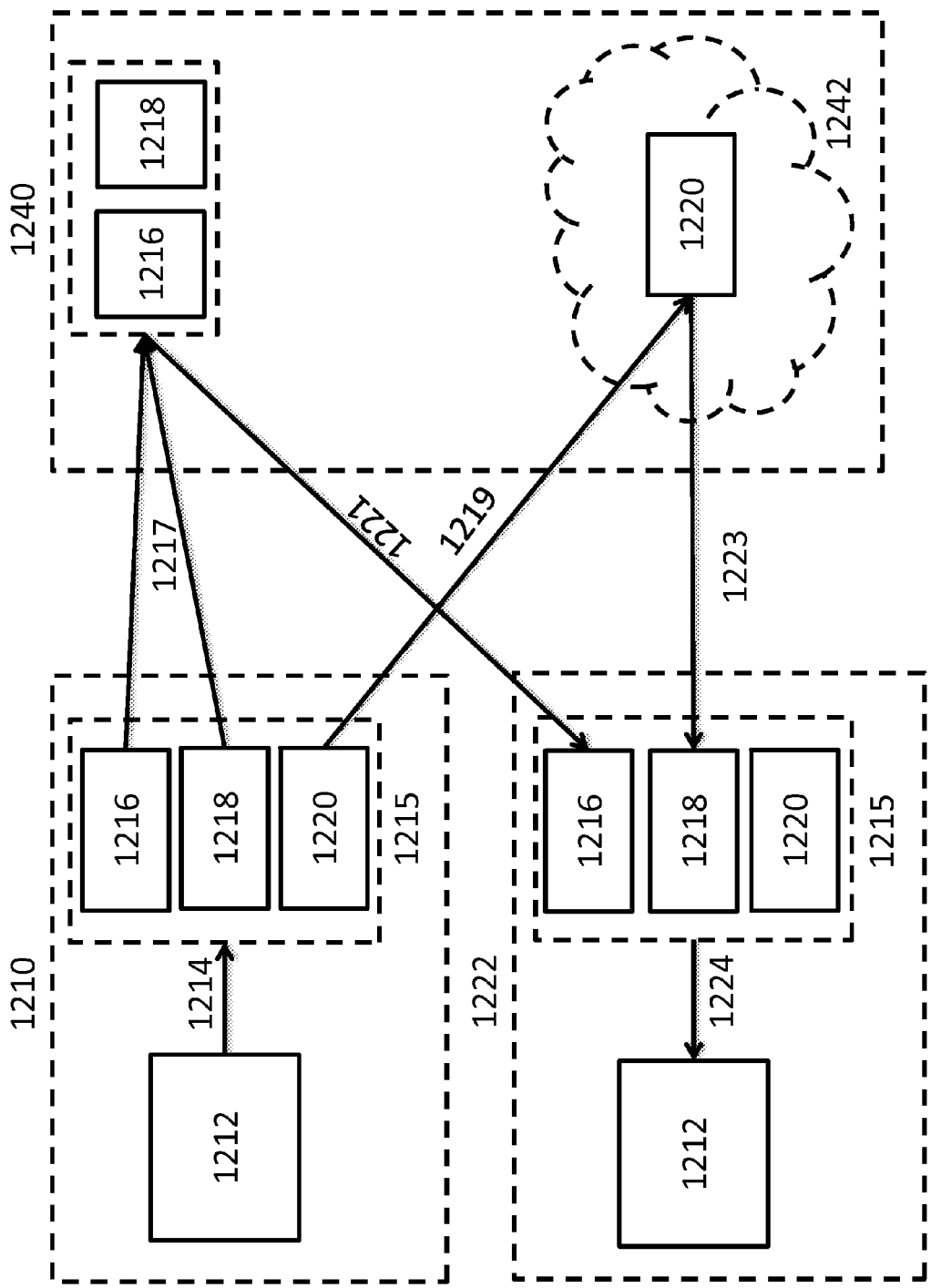
FIG. 12 is a wireframe showing an overview of an exemplary zero-knowledge mail embodiment.

Now referring to exemplary FIG. 11, a detailed view of the sharing group folder download of a content record 810 may be provided. The hashed file name 822 and hashed file key name 824 may be used by the second user device 1008 to call an encrypted content file record 812 and encrypted file key record 818 from a cloud storage/server 820. The second user device may use a second user private key 1016 to decrypt an encrypted file key 818, resulting in a decrypted file key 814 on the second user device 1008. The encrypted content file record 812 may subsequently be decrypted resulting in a reproduction of the content file 810.

Now, exemplary FIG. 12-18 may refer to a mailbox embodiment. A mail file 1212 may be encrypted on a sender device 1210 using a public key for a recipient 1214. Encrypted data 1215 may include a mail message 1216, encrypted content 1218 and encrypted metadata 1220. The encrypted data 1215 may be uploaded 1217, 1219 to at least one server 1240, 1242. A mail message, encrypted metadata, and encrypted content may be accessed and retrieved 1221, 1223 by a recipient device 1222. A recipient private key 1224 may subsequently be used to decrypt the data 1215 resulting in a file 1212.

Figure 13:
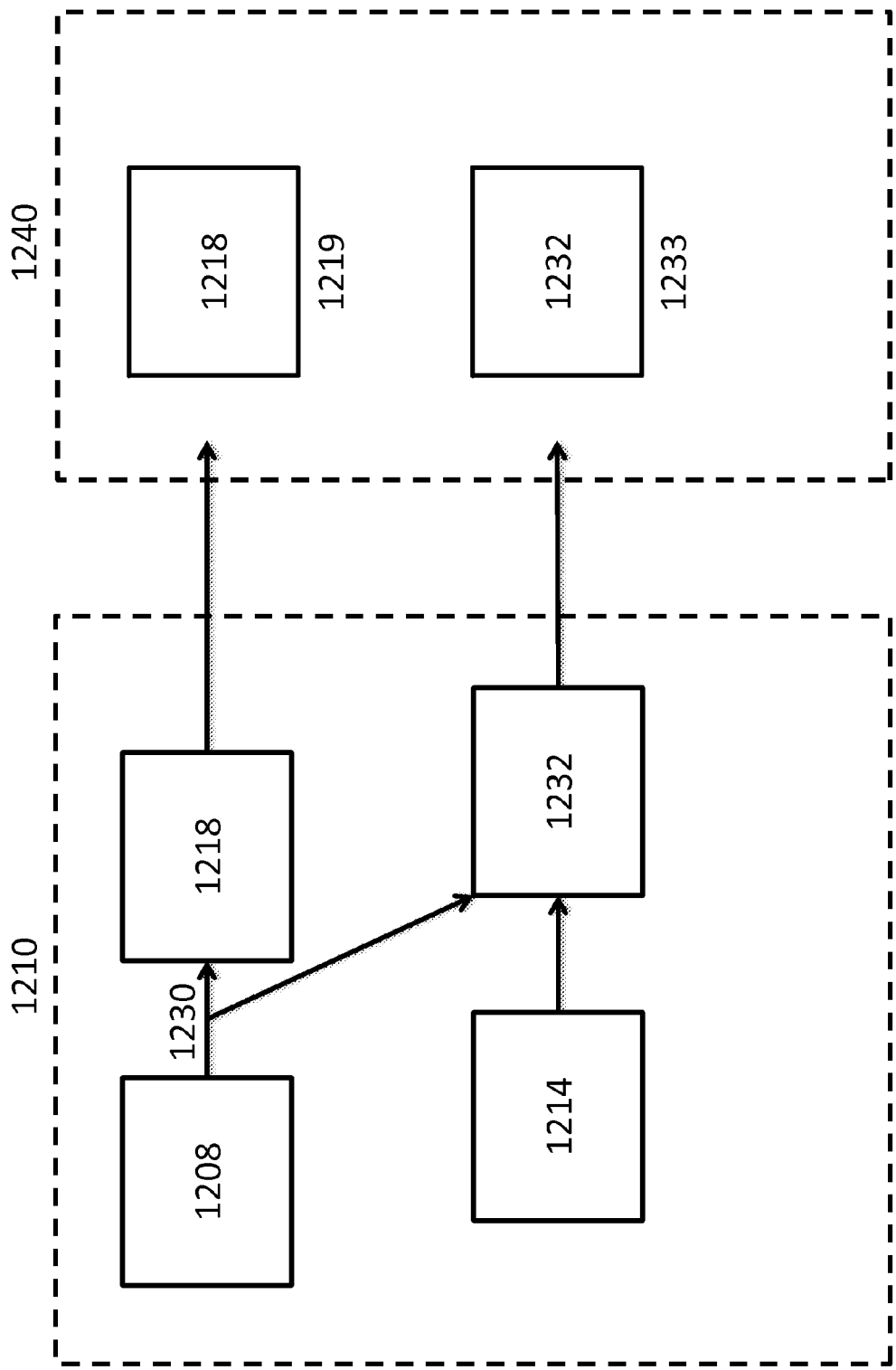
FIG. 13 is a wireframe showing an exemplary mail file upload.

Now referring to exemplary FIG. 13, a more detailed view of a mailbox send may be provided. A content record 1208 of a mail file 1212 (shown in exemplary FIG. 12) may be encrypted using a file-key 1230 resulting in a cipher text record 1218. A file-key 1230 may be encrypted using a recipient public-key 1214, resulting in an encrypted file-key 1232. The cipher text record 1218 and encrypted file-key 1232 may be uploaded to a server 1242. The cipher text record 1218 may include a hashed file name 1219 and the encrypted file-key 1232 may include a hashed file key name 1233.

Figure 14:
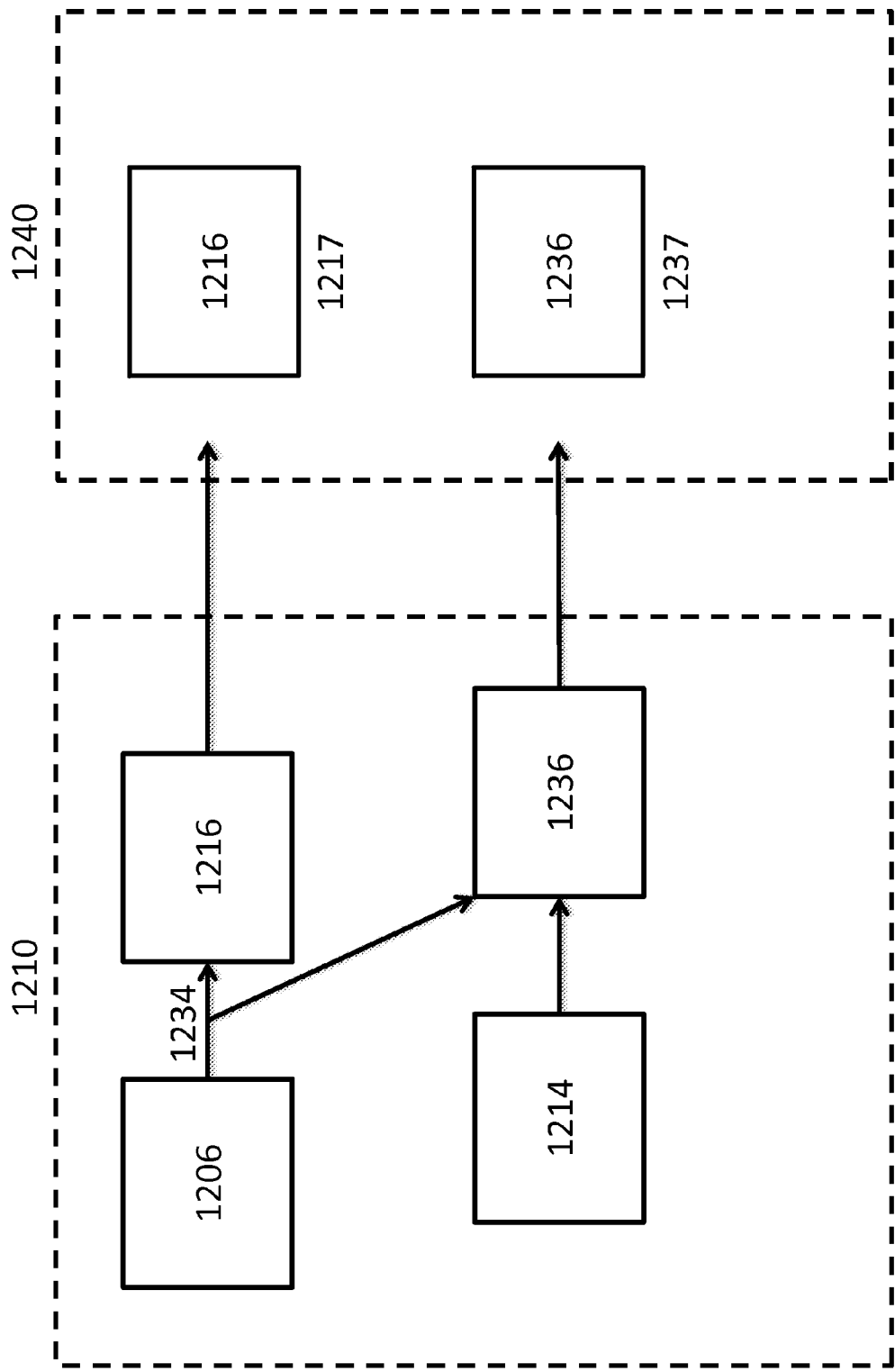
FIG. 14 is a wireframe showing an exemplary mail metadata upload.

Now referring to exemplary FIG. 14, a mailbox send of a metadata DB may be disclosed. A metadata DB record 1206 of a mail file 1212 may be encrypted with a DB-key 1234 resulting in a cipher text metadata DB record 1216. The encrypted metadata DB record 1216 may subsequently be uploaded to a server 1240. The DB-key 1234 may be encrypted with a recipient public key 1214, resulting in encrypted DB-key 1236, which may be uploaded to a server 1240. The encrypted metadata record 1216 may include a hashed file name 1217 and the encrypted DB-key 1236 may include a hashed DB-key name 1237.

Figure 15:
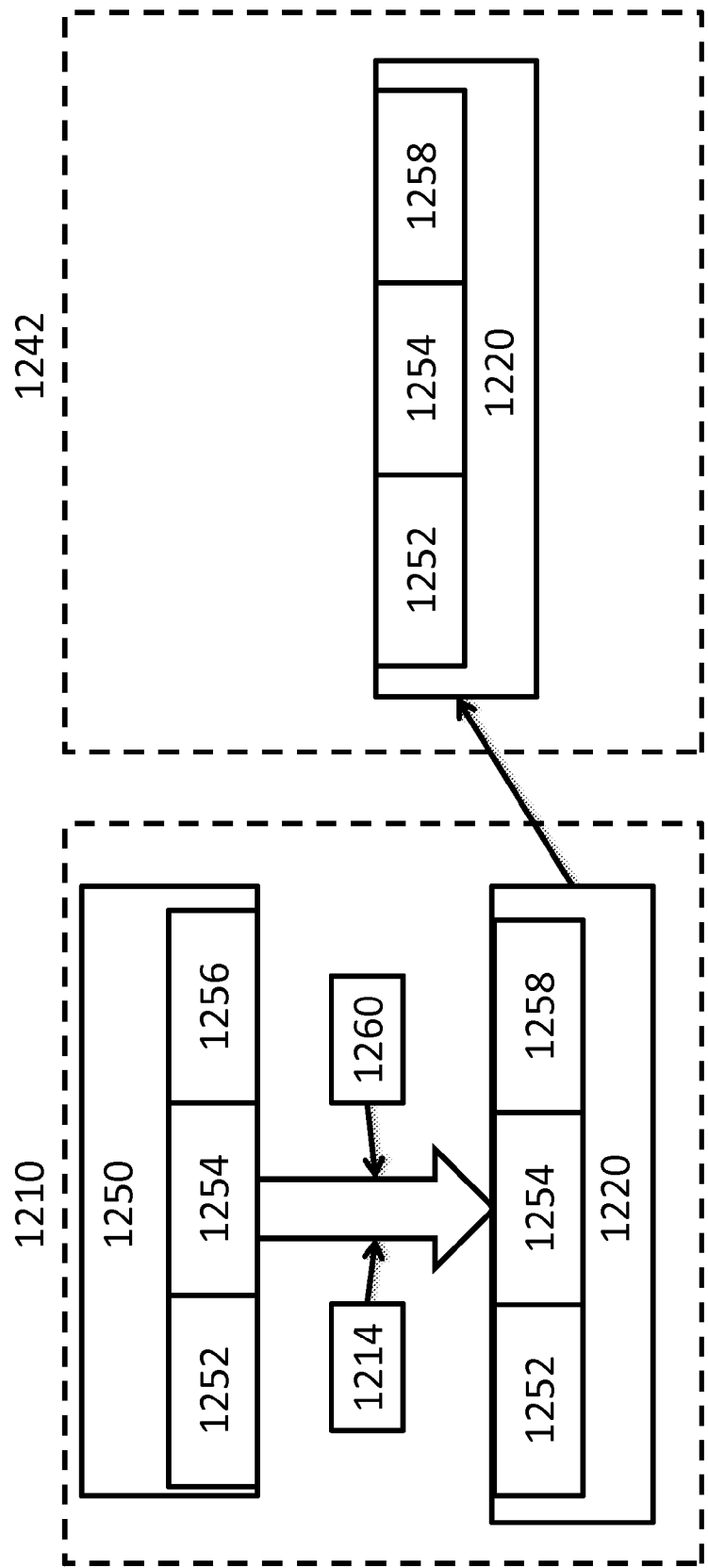
FIG. 15 is a wireframe showing an exemplary mail message upload.

In exemplary FIG. 15, the sending of a mail message record may be detailed. A mail message record 1250 may be created by a sender on a sender device 1210. The record 1250 may include sender data 1252, recipient data 1254, and message body data 1256. The message body 1256 may be encrypted using a recipient public key 1214 and may be digitally signed using a sender's private key 1260. The encrypted message body 1258 may be included in a message record 1220 stored on a server 1242, such as a mailroom server. The encrypted message body 1258 may be encrypted and tamper-proof.

Figure 16:
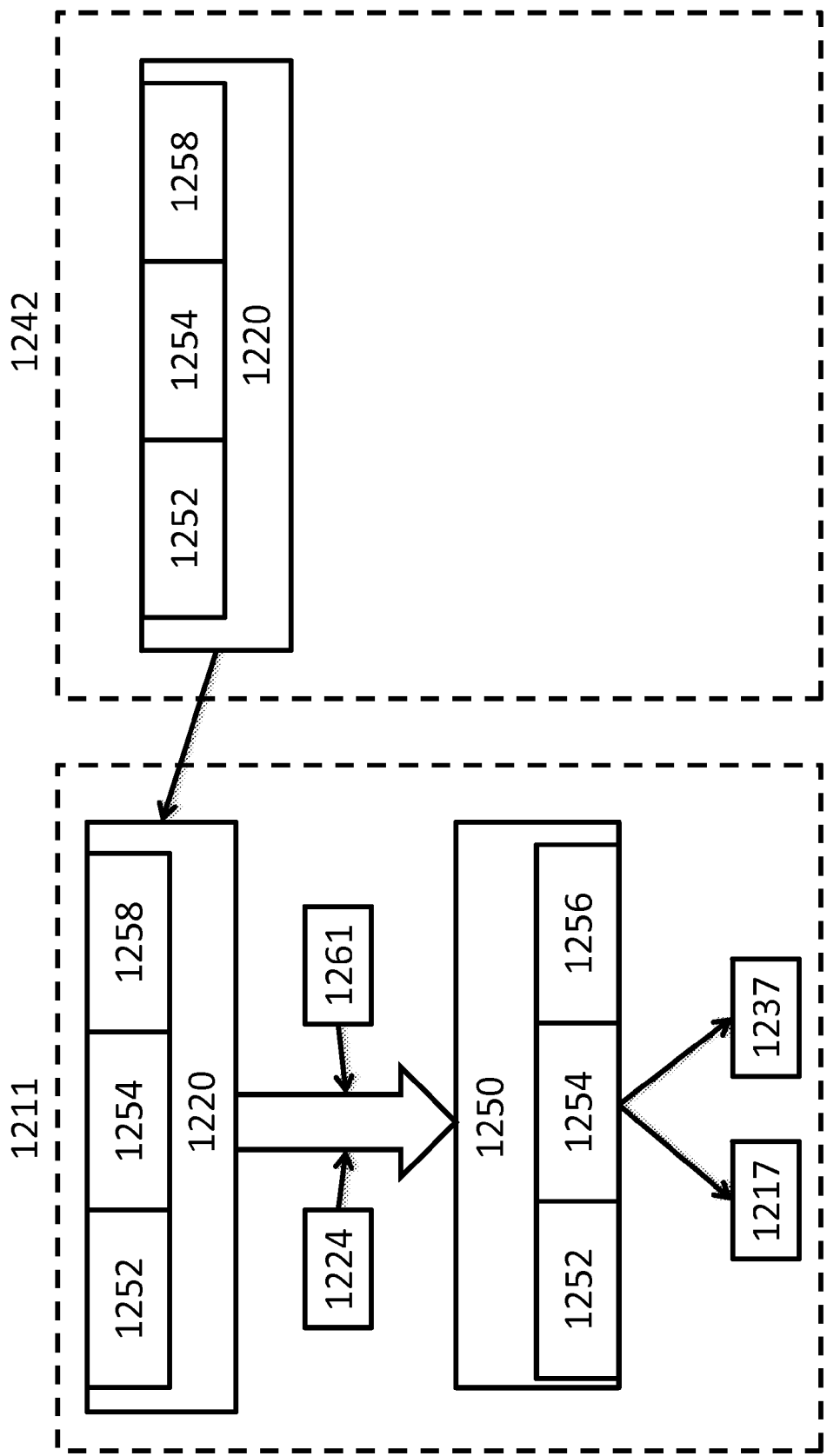
FIG. 16 is a wireframe showing an exemplary mail message download.

In exemplary FIG. 16, receiving of a mail message record may be detailed. An encrypted mail message record 1220 may be retrieved by a recipient device 1211 from a server 1242. An encrypted mail message record 1220 may include sender data 1252, recipient data 1254, and an encrypted and signed message body 1258. A recipient private key 1224 may be used to decrypt an encrypted mail message record 1220 and a sender public key 1261 may be used to verify a sender's signature. The resulting decrypted mail message record 1250 may include sender data 1252, recipient data 1254 and a decrypted message body 1256. Metadata DB file location data on a server or cloud storage 1240, including a hashed name 1217 and hashed DB-key name 1237, may be included in decrypted mail message record 1250.

Figure 17:
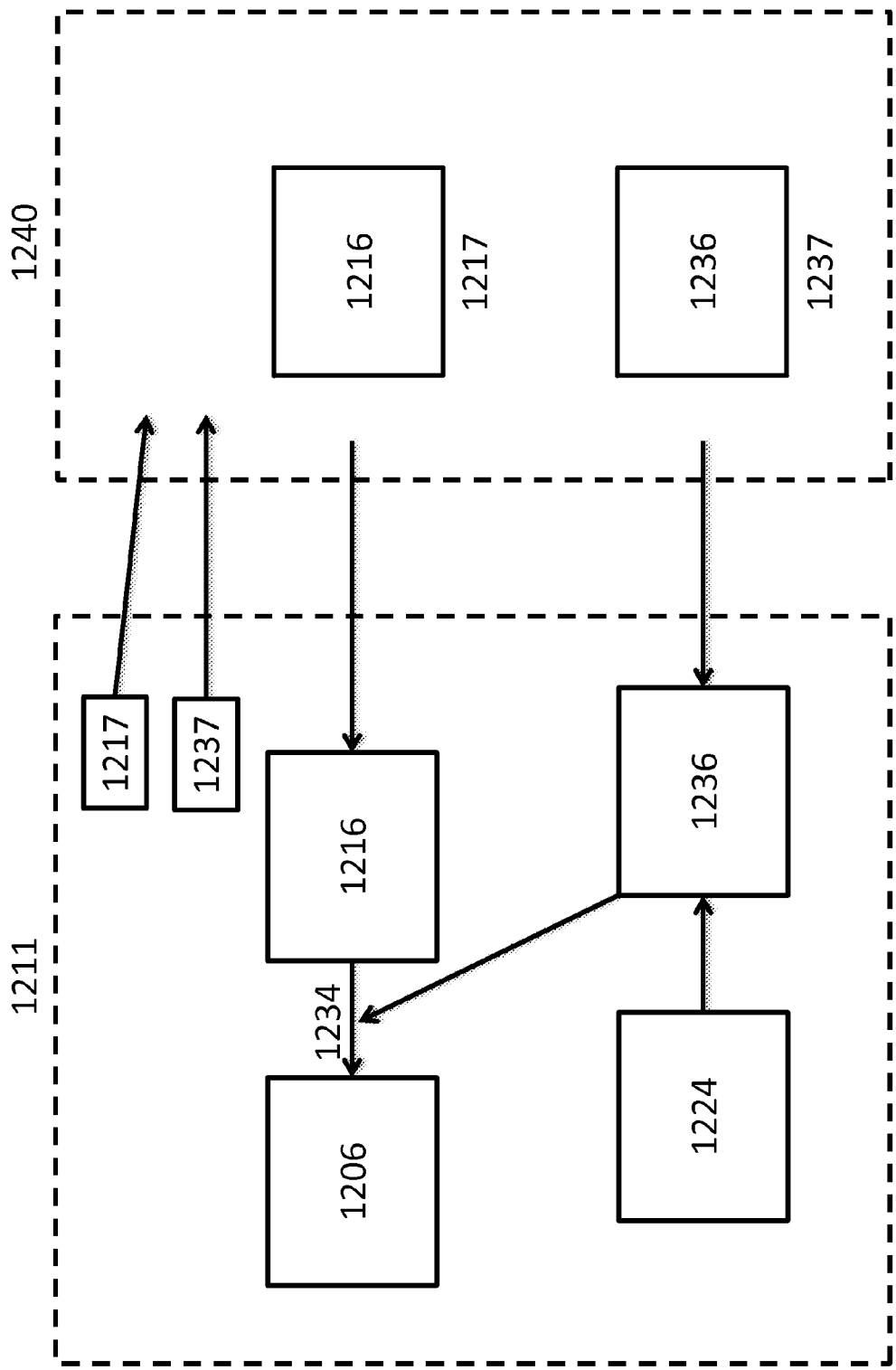
FIG. 17 is a wireframe showing an exemplary mail metadata download.

Now referring to exemplary FIG. 17, receiving of a metadata DB record may be provided. A recipient device 1211 may retrieve an encrypted metadata DB record 1216 and an encrypted DB-key 1236 using a metadata DB hashed name 1217 and DB-key hashed name 1237. The retrieved encrypted DB-key 1236 may be decrypted using a recipient's private key 1224, resulting in DB-key 1234. DB-key 1234 may be utilized in decrypting encrypted metadata DB 1216 to subsequently recreate metadata DB 1206. Metadata DB 1206 may include a hashed file name 1219 and hashed file-key name 1233.

Figure 18:
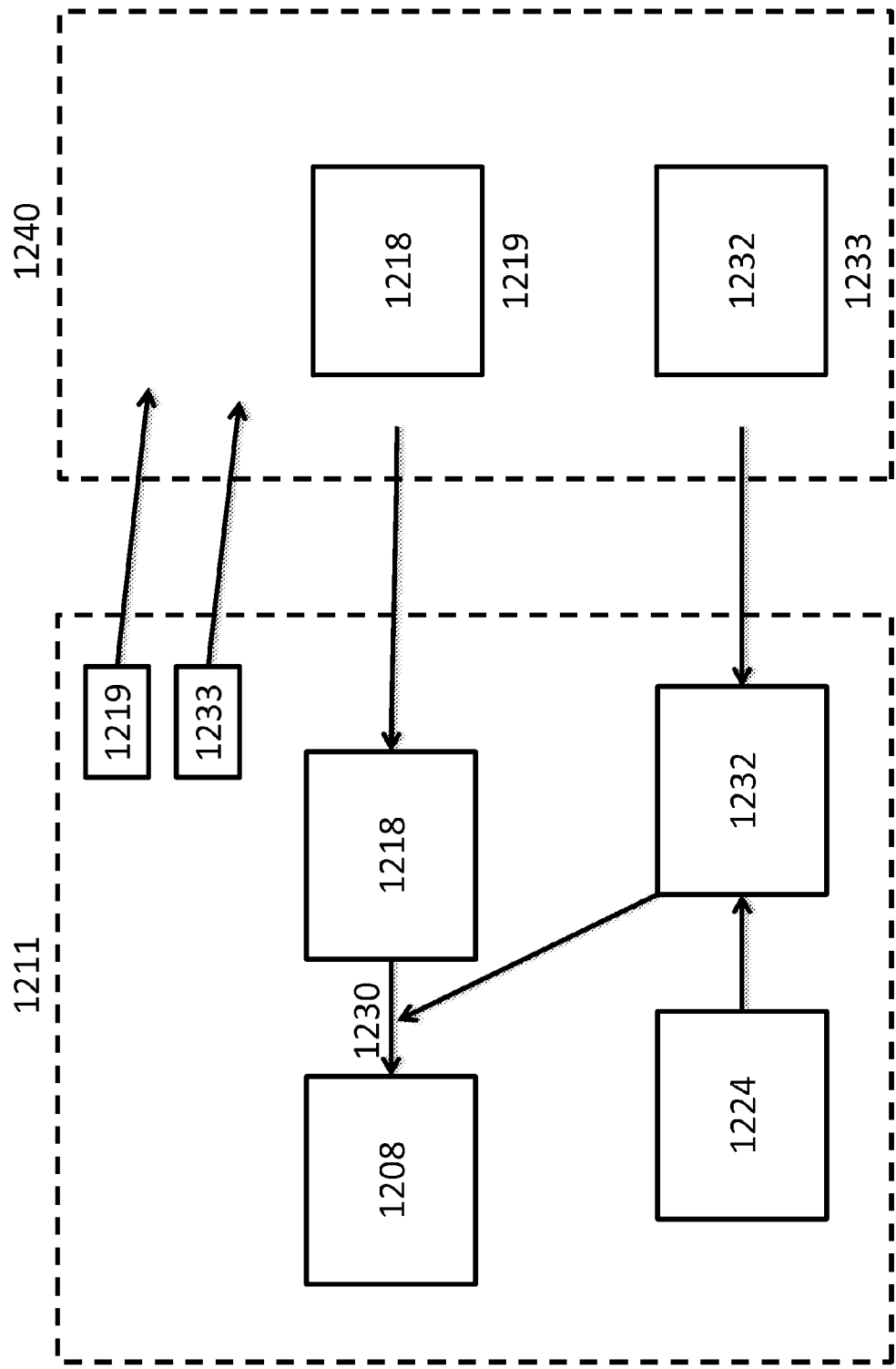
FIG. 18 is a wireframe showing an exemplary mail file download.

Now referring to exemplary FIG. 18, receiving and decrypting an encrypted mail content record 1218 may be disclosed. A recipient device 1211 may retrieve an encrypted mail content record 1218 and an encrypted file-key 1232 from a server 1240, or cloud storage, using a hashed file name 1219 and a hashed file-key name 1233. An encrypted file-key 1232 may be decrypted using a recipient private key 1224, resulting in a decrypted file-key 1230. A decrypted file key 1230 may be used in the decryption of an encrypted mail content record 1218, resulting in a decrypted content record 1208.

Figure 19:
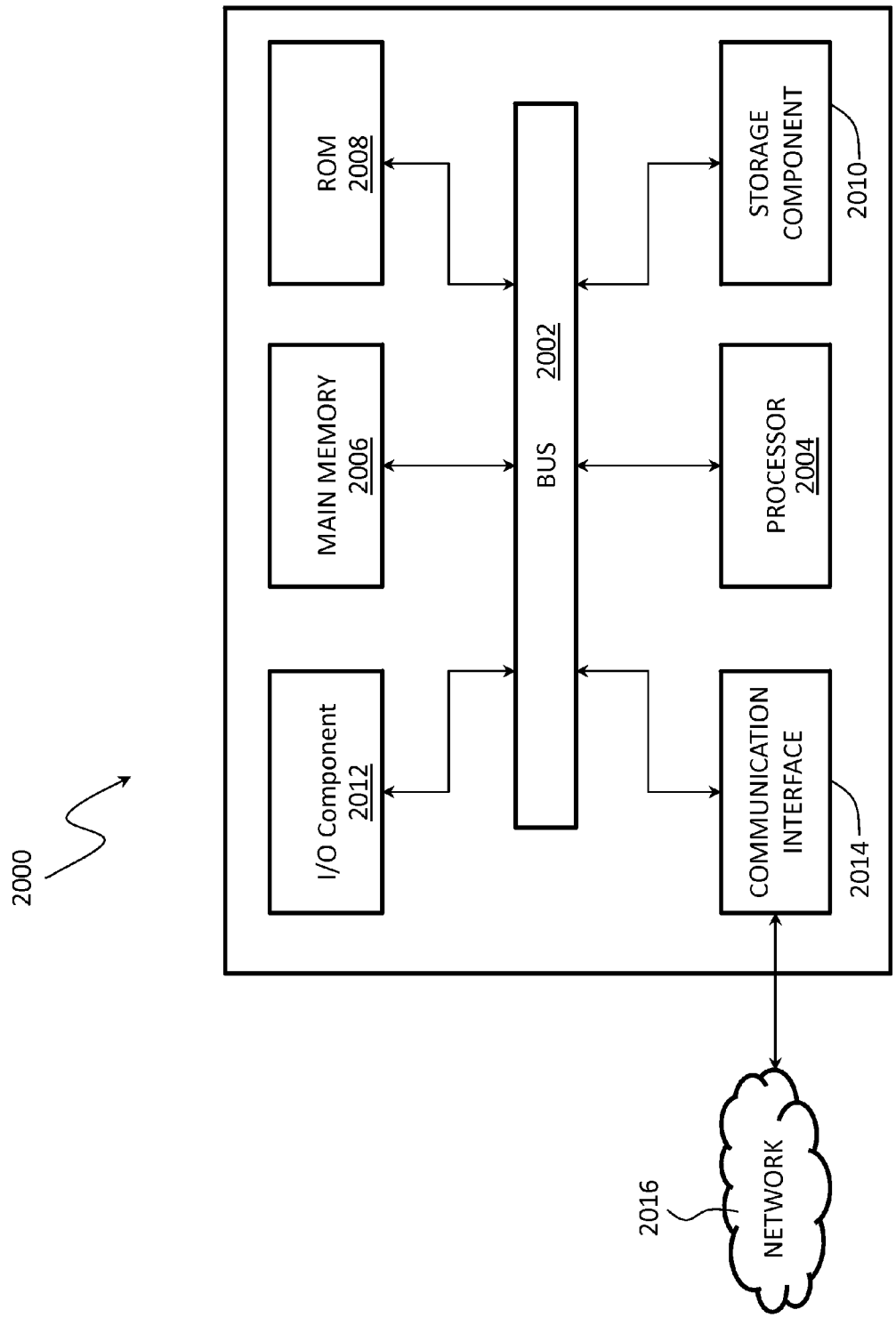
FIG. 19 is a diagram showing an exemplary computer system.

Now referring to exemplary FIG. 19, an exemplary computer system 2000 may be provided upon which portions of the present description may be performed. In some exemplary embodiments, multiple implementations of computer system 2000 may be used to perform the functions described herein. The computer system 2000 may include a bus 2002 or other communication mechanism for communicating information, and a processor 2004 coupled with the bus 2002 for processing the information. The computer system 2000 also includes a main memory 2006, such as a random access memory (RAM) or other dynamic storage device (e.g., dynamic RAM (DRAM), static RAM (SRAM), and synchronous DRAM (SDRAM)), coupled to the bus 2002 for storing information and instructions to be executed by processor 2004. In addition, the main memory 2006 may be used for storing temporary variables or other intermediate information during the execution of instructions by the processor 2004. The computer system 2000 may further include a read only memory (ROM) 2008 or other static storage device (e.g., programmable ROM (PROM), erasable PROM (EPROM), and electrically erasable PROM (EEPROM)) coupled to the bus 2002 for storing static information and instructions for the processor 2004.

The computer system 2000 may also include at least one storage component 2010 coupled to the bus 2002. The computer system 2000 may perform a portion or all of the processing steps of the invention in response to the processor 2004 executing one or more sequences of one or more instructions contained in a memory, such as the main memory 2006. Such instructions may be read into the main memory 2006 from another computer readable medium, such as the storage component 2010.

The computer system 2000 may further include an input/output component 2012 coupled to the bus 2002 to allow for the connection of input and output devices. The computer system 2000 may also include a communication interface 2014 coupled to the bus 2002. The communication interface 2014 may provide a two-way data communication coupling to other devices and/or systems, such as a network 2016. The communication interface 2014 may be a wired or wireless link. In any such implementation, the communication interface 2014 may send and receive electrical, electromagnetic or optical signals that carry digital data streams representing various types of information.

Through implementation of the present disclosure, file sharing may be distributed rather than centralized. This may allow each device to be self-sufficient. As described, each file may have metadata and content. Metadata may be recorded in a local database. In some embodiments, metadata may not be encrypted for transfer, but may be transferred as its own database record in an unencrypted format. A DVCS may push the metadata to a server and the metadata may subsequently be pushed downstream to another server or device. This may cause the server to have no control over the metadata record. The file transfer and mailing process may proceed with the unencrypted metadata substantially as described above.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of secure file transfer comprising:
   determining a desired recipient;
   retrieving a public key associated with a recipient;
   isolating a metadata record for a file from a content record for the file;
   encrypting the metadata record for the file using the public key associated with the desired recipient;
   encrypting the content record for the file using the public key associated with the recipient;
   uploading the encrypted metadata record for the file to a first server from a transfer device;
   uploading the encrypted content record for the file to at least one of the first server or a second server from a transfer device;
   downloading the encrypted metadata record for a file on a recipient device;
   decrypting the encrypted metadata record for a file using a private key associated with the recipient;
   retrieving the encrypted content record for the file from the first server using the decrypted metadata record; and
   decrypting the encrypted content record for the file using the private key associated with the recipient,
   wherein the first server and the second server have no access to the recipient private key, the decrypted metadata record, and the decrypted content record.

2. The method of claim 1, the encrypting of the content record for the file further comprising encrypting the content record resulting in a ciphertext record using a file-key and encrypting the file-key using the public key.

3. The method of claim 1, the encrypting of the metadata record for the file further comprising encrypting the metadata record resulting in a ciphertext metadata record using a DB-key to secure and identify the ciphertext metadata record and encrypting the DB-key associated with the encrypted metadata record using the public key.

4. The method of claim 1, wherein the encrypted metadata record is uploaded to the first server using a distributed version control system.

5. The method of claim 4, wherein the encrypted metadata record is downloaded from the first server using a distributed version control system.

6. The method of claim 1, the decrypting of the metadata record further comprising using the private key to decrypt the DB-key and using the decrypted DB-key to decrypt the metadata ciphertext resulting in a recreated metadata record.

7. The method of claim 1, the decrypting of the content record further comprising using an identifying record from the decrypted metadata record to identify and retrieve the encrypted content record and encrypted file-key, using the private key to decrypt the encrypted file-key, and decrypting the content record using the decrypted file-key.

8. A non-transitory computer readable medium for zero-knowledge file transfer, comprising instructions stored thereon, that when executed on a processor, perform the steps of:
   determining a desired recipient;
   retrieving a public key associated with a recipient;
   isolating a metadata record for a file from a content record for the file;
   encrypting the metadata record for the file using the public key associated with the recipient;
   encrypting the content record for the file using the public key associated with the recipient;
   uploading the encrypted metadata record for the file to a first server from a transfer device;
   uploading the encrypted content record for the file to at least one of the first server or a second server from a transfer device;
   downloading the encrypted metadata record for a file on a recipient device;
   decrypting the encrypted metadata record for a file using a private key associated with the recipient;
   retrieving the encrypted content record for the file from the first server using the decrypted metadata record; and
   decrypting the encrypted content record for the file using the private key associated with the recipient,
   wherein the first server and the second server have no access to the recipient private key, the decrypted metadata record, and the decrypted content record.

9. The non-transitory computer readable medium of claim 8, the encrypting of the content record for the file further comprising encrypting the content record resulting in a ciphertext record using a file-key and encrypting the file-key associated with the encrypted content record using the public key.

10. The non-transitory computer readable medium of claim 8, the encrypting of the metadata record for the file further comprising encrypting the metadata record resulting in a ciphertext metadata record using a DB-key to secure and identify the ciphertext metadata record and encrypting the DB-key associated with the encrypted metadata record using the public key.

11. The non-transitory computer readable medium of claim 8, the uploading of the encrypted metadata record further comprising packing the record and pushing to a server using a distributed version control system.

12. The non-transitory computer readable medium of claim 8, the downloading of the encrypted metadata record further comprising pulling the packed record from the server and unpacking the record using a distributed version control system.

13. The non-transitory computer readable medium of claim 8, the decrypting of the metadata record further comprising using the private key to decrypt the DB-key and using the decrypted DB-key to decrypt the metadata ciphertext resulting in a recreated metadata record.

14. The non-transitory computer readable medium of claim 8, the decrypting of the content record further comprising using an identifying record from the decrypted metadata record to identify and retrieve the encrypted content record and encrypted file-key, using the private key to decrypt the encrypted file-key, and decrypting the content record using the decrypted file-key.

15. A non-transitory computer readable medium for zero-knowledge mail transfer, comprising instructions stored thereon, that when executed on a processor, perform the steps of:

encrypting a content record of a mail file using a file-key, resulting in a ciphertext record;
encrypting the file-key using a recipient public key, resulting in an encrypted file-key;
uploading the encrypted file-key and ciphertext record to a server;
encrypting a metadata record of the mail file using a DB-key, resulting in a ciphertext metadata record;
uploading the encrypted metadata record to a server;
encrypting the DB-key with a recipient public key, resulting in an encrypted DB-key;
uploading the encrypted DB-key to the server;
encrypting a mail message record using a recipient public key and storing the mail message record on a mail server;
receiving the mail message record from the mail server;
decrypting the mail message record using a recipient private key;
retrieving an encrypted metadata record and encrypted DB-key;
decrypting the DB-key using the private key;
recreating the metadata record using the DB-key;
retrieving an encrypted mail content record and encrypted file-key;
decrypting the encrypted file-key using the private key;
recreating the mail content record using the file-key,
wherein the server and the mail server have no access to the recipient private key, the decrypted metadata record, and the decrypted content record.

16. The non-transitory computer readable medium of claim 15, further comprising digitally signing a mail message record using a sender's private key.

17. The non-transitory computer readable medium of claim 16, further comprising verifying a mail message record using a sender's public key.

* * * * *